United States Patent [19]

Horwitz et al.

[11] 4,162,230

[45] Jul. 24, 1979

[54] METHOD FOR THE RECOVERY OF ACTINIDE ELEMENTS FROM NUCLEAR REACTOR WASTE

[75] Inventors: E. Philip Horwitz, Elmhurst; Walter H. Delphin, Woodridge; George W. Mason, Clarendon Hills, all of Ill.

[73] Assignee: The United States of America as represented by the United States Department of Energy, Washington, D.C.

[21] Appl. No.: 865,346

[22] Filed: Dec. 28, 1977

[51] Int. Cl.$^2$ ........................... G21F 9/04; G21F 9/06
[52] U.S. Cl. ................................. 252/301.1 W; 423/8; 423/9; 423/10
[58] Field of Search .................... 252/301.1 W; 423/8, 423/9, 10

[56] References Cited

U.S. PATENT DOCUMENTS

| | | | |
|---|---|---|---|
| 3,595,629 | 7/1971 | Schulz | 423/10 |
| 3,748,104 | 7/1973 | Koehly | 423/10 |
| 3,981,961 | 9/1976 | Bathellier et al. | 423/10 |
| 4,011,296 | 3/1977 | Ruiz et al. | 423/10 |

FOREIGN PATENT DOCUMENTS 576900 6/1959 Canada ..................................... 423/10

OTHER PUBLICATIONS

Mason, G. W. et al., "Diluent Effects in the Extraction of Selected Metallic Cations by Bis(Hexoxy-Ethyl) Phosphoric Acid", *J. Inorg. Nucl. Chem.*, 1967, vol. 29, pp. 1103-1112.

Swarup, R. et al., Chem. Abstracts, 81, (Dec. 1974), #144509t.

*Primary Examiner*—Benjamin R. Padgett
*Assistant Examiner*—Deborah L. Kyle
*Attorney, Agent, or Firm*—Dean E. Carlson; Frank H. Jackson; James W. Weinberger

[57] ABSTRACT

A process for partitioning and recovering actinide values from acidic waste solutions resulting from reprocessing of irradiated nuclear fuels by adding hydroxylammonium nitrate and hydrazine to the waste solution to adjust the valence of the neptunium and plutonium values in the solution to the +4 oxidation state, thus forming a feed solution and contacting the feed solution with an extractant of dihexoxyethyl phosphoric acid in an organic diluent whereby the actinide values, most of the rare earth values and some fission product values are taken up by the extractant. Separation is achieved by contacting the loaded extractant with two aqueous strip solutions, a nitric acid solution to selectively strip the americium, curium and rare earth values and an oxalate solution of tetramethylammonium hydrogen oxalate and oxalic acid or trimethylammonium hydrogen oxalate to selectively strip the neptunium, plutonium and fission product values. Uranium values remain in the extractant and may be recovered with a phosphoric acid strip. The neptunium and plutonium values are recovered from the oxalate by adding sufficient nitric acid to destroy the complexing ability of the oxalate, forming a second feed, and contacting the second feed with a second extractant of tricaprylmethylammonium nitrate in an inert diluent whereby the neptunium and plutonium values are selectively extracted. The values are recovered from the extractant with formic acid.

7 Claims, 2 Drawing Figures

LEGEND

HDHoEP ------ Di-hexoxyethylphosphoric Acid
TCMA-$NO_3$ --- Tricaprylmethylammonium Nitrate
HAN ---------- Hydroxyl Ammonium Nitrate
DEB ---------- Diethylbenzene
TMA-HOx ----- Tetramethylammonium Hydrogen Oxalate
$H_2$Ox -------- Oxalic Acid
$N_2H_4$ --------- Hydrazine

4,162,230

METHOD FOR THE RECOVERY OF ACTINIDE ELEMENTS FROM NUCLEAR REACTOR WASTE

CONTRACTUAL ORIGIN OF THE INVENTION

The invention described herein was made in the course of, or under, a contract with the U.S. DEPARTMENT OF ENERGY.

BACKGROUND OF THE INVENTION

This invention relates to a method for recovering actinide elements from acidic radioactive waste solutions resulting from the reprocessing of irradiated nuclear reactor fuel.

One of the major problems confronting the nuclear power industry is management of the highly radioactive liquid wastes which result from the reprocessing of irradiated nuclear reactor fuel. One approach is to solidify the liquid wastes as they come from the reprocessing facility into a stable solid material which can be stored in the earth for a period of time sufficient for the radiation to decay to safe levels. However, the storage times required to achieve safe levels of radioactivity are on the order of a million years. This is far longer than the geological stability of the earth can be expected to be maintained. One solution is to remove the extremely long-lived radioactive components from the waste solutions—such as the actinides, i.e. the uranium, americium, curium, plutonium and neptunium—so that the remaining radioactive elements, presenting the bulk of the radioactive waste, need only be stored for up to 1000 years before the radioactivity reaches background levels. This time period is within the realm of determining geological integrity. The actinides thus recovered from the waste can then be reprocessed and recycled to provide additional fuel for nuclear power reactors and for isotopic power sources.

One major problem with recovering the actinides from large volumes of acidic high-level radioactive waste solutions is to find a method which will do so effectively and economically, since the actinides are present in several valence states and difficult to recover together. The extractant, di-hexoxyethylphosphoric acid, (hereinafter HDHoEP) is known to extract tetra and hexavalent actinides from an acidic solution, along with some fission products and rare earths. However, because the extractant has a strong affinity for the actinide elements, there has heretofore been no effective means for recovering or backextracting the actinides from the HDHoEP extractant and for separating the actinides from the co-extracted elements.

SUMMARY OF THE INVENTION

We have developed a process for partitioning or separating actinide values from an acidic radioactive waste solution using HDHoEP by which we are able to recover the actinide values from the extractant, separate the actinides from the co-extracted fission products and rare earth, and separate some of the actinide values from each other.

According to the process for separating actinide values from acidic radioactive waste solutions containing actinide values, rare earth values, fission product values and other metal values, sufficient hydrazine and hydroxylammonium nitrate is added to the waste solution to adjust the oxidation state of the neptunium and plutonium present in the waste solution to a valence of +4 to form a feed solution, which is contacted with an organic extractant of 0.1 to 1.5 $\underline{M}$ HDHoEP in a water-immiscible inert aromatic or aliphatic hydrocarbon diluent whereby the actinide, rare earth, fission product zirconium, niobium, and molybdenum, yttrium and iron values are extracted while the other values remain in the feed, the loaded extractant is then contacted with two aqueous strip solutions, a nitric acid solution which selectively strips the curium, americium and rare earth values from the extractant, and an oxalate solution of oxalic acid and tetramethylammonium hydrogen oxalate (hereinafter TMA-HOx) or trimethylammonium hydrogen oxalate which selectively strip the plutonium and neptunium values from the extractant along with fission product zirconium, niobium, and molybdenum, and iron values. The uranium and yttrium values remain in the extractant and may be recovered with a phosphoric acid strip. Neptunium and plutonium values are recovered from the oxalate strip and purified of fission products by adding nitric acid to the oxalate strip containing the values in an amount sufficient to destroy the complexing ability of the oxalate, forming a second feed, contacting the second feed containing the values with an extractant of tricaprylmethyl ammonium nitrate (hereinafter TCMA·NO$_3$) in a water-immiscible inert aliphatic or aromatic hydrocarbon diluent whereby the neptunium and plutonium values are selectively extracted while the other values remain in the feed, and contacting the extractant with a formic acid solution whereby the neptunium and plutonium values are stripped from the extractant, thereby recovering and purifying the neptunium and plutonium values. The acid may be recovered from the raffinate of the various stripping steps for recycle while the waste may be combined with the remaining first and second feed solutions and solidified for long term storage.

The use of HDHoEP as an extractant has several advantages over other similar extractants and in particular over many of the dialkyl phosphoric acids. For example, phosphoric acid extractants gelate by forming insoluble polymers when saturated or only partially saturated with extractable elements. This prevents separation of the aqueous and organic phases, making the process impossible or, at best, difficult to operate. However, it is possible to saturate HDHoEP without any gel formation, allowing the use of feed solutions having higher concentrations of extractable values.

Many organic extractants when subjected to high levels of irradiation decompose to compounds which no longer function as extractants or to compounds which adversely affect the extractability of the extractant. HDHoEP, although affected by radiation, generally decomposes to compounds which do not adversely affect its function as an extractant. This permits use of the extractant for a longer period of time before it must be subjected to costly clean-up procedures and reduces the quantity of additional extractant which must be added to maintain process volumes.

Another advantage of using HDHoEP as an extractant is that it may be used with any mineral acid feed solution and which may vary from slightly acidic to strongly acidic. This permits the use of the same process over a wide range of feed solution conditions.

It is therefore one object of this invention to provide a process for separating actinide values from acidic radioactive waste solutions resulting from the reprocessing of irradiated nuclear reactor fuel.

It is a further object of the invention to provide a process for separating actinide values from acidic radioactive waste solutions and for purifying these values from the rare earth and fission product values also present in the waste solutions.

It is another object of the invention to provide a process for recovering the actinide values from a wide variety of feed solutions containing these and other values.

Finally, it is the object of the invention to provide a process for recovering and separating actinide values from acidic radioactive waste solutions containing these and other values and for separating some of the actinide values from each other.

DESCRIPTION OF THE PREFERRED EMBODIMENT

Figure 1:
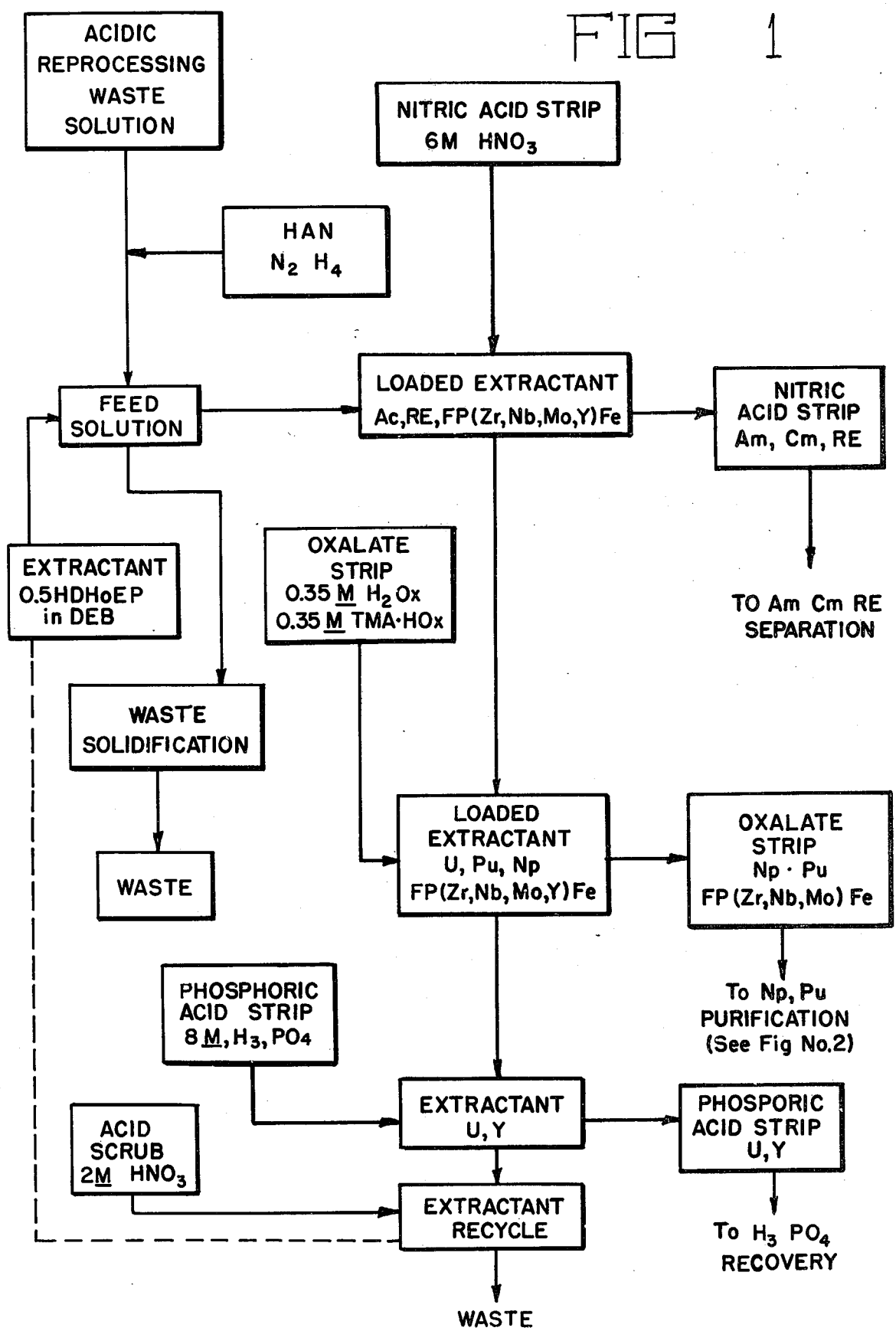
FIG. 1 is a flow diagram of one embodiment of the process of the invention for recovering actinide values from an acidic radioactive waste solution.
Figure 2:
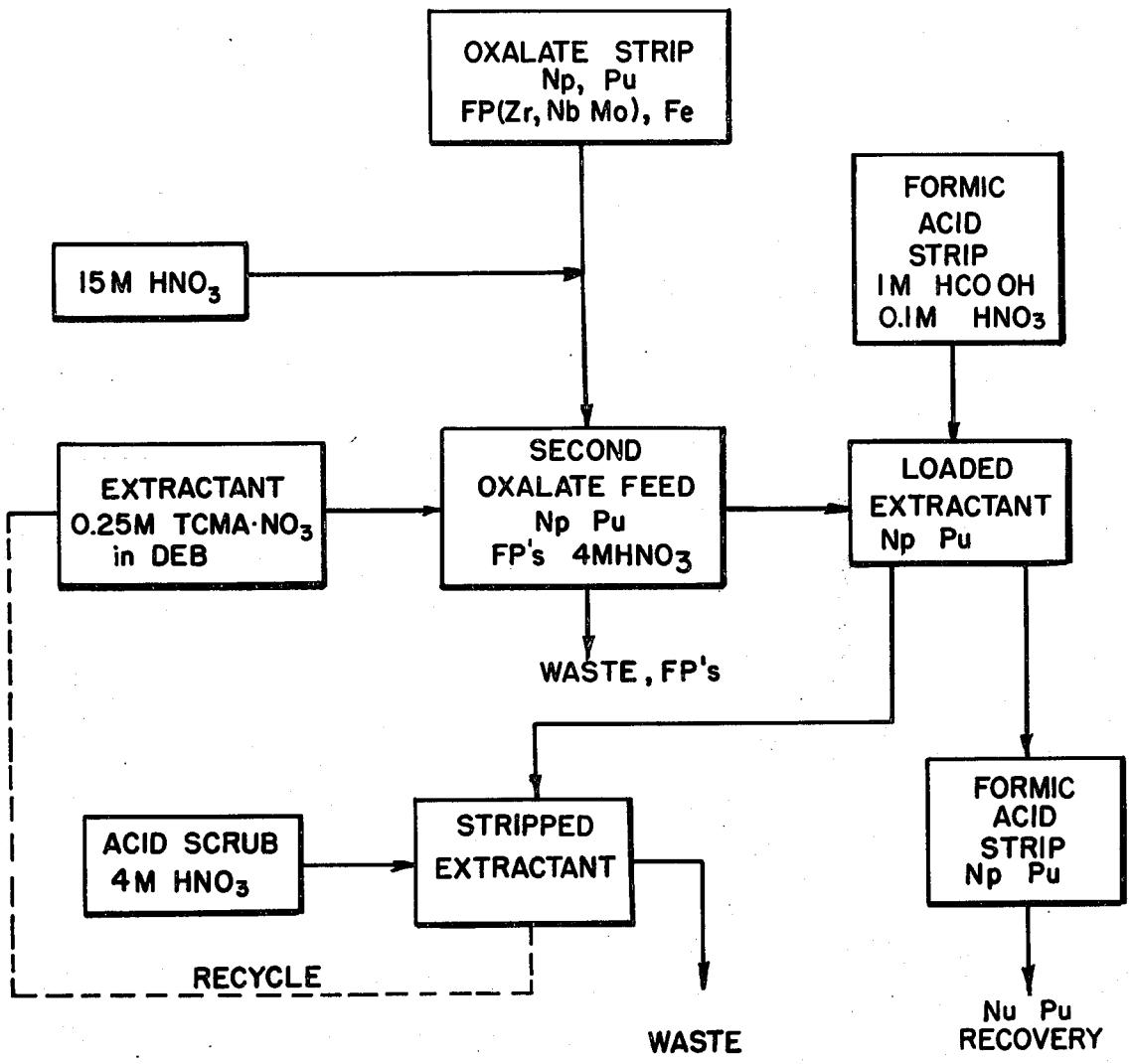
FIG. 2 is a flow diagram of the process for recovering and purifying neptunium and plutonium values from the oxalate strip solution as shown in FIG. 1.

These and other objects of the invention for separating actinide values from an acidic nuclear fuel reprocessing waste solution containing actinide, rare earth, fission product and other metal values are met by adding equimolar amounts of hydrazine and hydroxyl ammonium nitrate to the waste solution in an amount sufficient to adjust and maintain the neptunium and plutonium values present at a valence of +4 to form a feed solution; contacting the feed solution with about an equal volume of an organic extractant of 0.5 $\underline{M}$ HDHoEP in a water-immiscible inert aliphatic or aromatic hydrocarbon diluent whereby the actinide, rare earth, fission product zirconium, niobium, and molybdenum, yttrium and iron values are taken up by the extractant while the other values remain in the feed solution; contacting the extractant with a nitric acid strip about 6 $\underline{M}$ in nitric acid whereby the americium, curium and rare earth values are selectively stripped from the extractant and recovered; contacting the extractant with an aqueous oxalate strip solution, about 0.35 $\underline{M}$ oxalic acid and about 0.35 $\underline{M}$ TMA·HOx whereby the neptunium, plutonium, and fission product zirconium, niobium and molybdenum and iron values are selectively stripped from the extractant into the oxalate strip while the uranium and yttrium values remain in the extractant; adding 15 $\underline{M}$ nitric acid to the oxalate strip solution in an amount sufficient to make the solution about 5 $\underline{M}$ in nitric acid, thereby destroying the complexing ability of the oxalate and forming a second feed solution; contacting the second feed solution with a second organic extractant of about 0.25 $\underline{M}$ tricaprylmethyl ammonium nitrate in a water-immiscible inert aliphatic or aromatic hydrocarbon diluent whereby the neptunium and plutonium values are selectively extracted from the feed solution; and contacting the extractant with an acid strip solution about 1.0 $\underline{M}$ in formic acid whereby the neptunium and plutonium values are stripped from the extractant and recovered, thereby recovering the neptunium and plutonium values.

The uranium values remaining in the HDHoEP extractrant may be recovered by contacting the extractant with about an 8 $\underline{M}$ phosphoric acid strip solution which strips the uranium and yttrium values which may then be recovered for reprocessing or added to the waste for solidification. The HDHoEP extractant can then be scrubbed with about 2 $\underline{M}$ HNO$_3$ and recycled.

The order of contact between the loaded HDHoEP extractant, the nitric acid strip and the oxalate strip may be reversed without any adverse effect upon the recovery of the various actinides.

The process of this invention is useful for recovering actinide values from any aqueous mineral acid waste solution containing these and other values and having an acid concentration varying from about 0.5 to about 3.0 $\underline{M}$. The process is particularly suitable for recovering actinides in the waste solutions resulting from fuel reprocessing by the Purex process which are generally from about 2.4 to about 3.0 $\underline{M}$ in nitric acid.

It is necessary that hydroxylammonium nitrate (HAN) and hydrazine (N$_2$H$_4$) be added to the waste solution in a quantity sufficient to reduce the neptunium and plutonium present in the solution to the extractable Np(IV) and Pu(IV), forming the feed solution. Thus, the amount to be added is dependent upon the quantities of these actinides present in the solution. The HAN reduces Np(VI) to Np(V) and in the presence of Fe(II) reduces Np(V) to Np(IV). Since iron is always present in the waste solution from the corrosion of stainless steel, Fe(II) is produced from Fe(III) by reduction with the HAN. Hydrazine is introduced along with the HAN to remove any excess HNO$_2$ which may be present in the solution and which would destroy the HAN. Thus it has been found that in recovering the actinide values from the nitric acid waste solution resulting from the Purex process, making the solution about 0.03 $\underline{M}$ in both HAN and hydrazine is sufficient to reduce the plutonium and neptunium values present to the +4 valence state. It might be noted that the reducing agents also reduce IO$_3$ present in the waste solution to I which is subsequently precipitated by an excess of Pd(II) present as PdI$_2$. Although not necessary, it is preferred that this PdI$_2$ be removed by filtration or centrifugation before carrying out subsequent steps since the solid tends to concentrate at the organic-aqueous interface, disrupting disengagement of the two phases.

The extractant may vary from 0.1 to 1.5 $\underline{M}$ in HDHoEP while 0.25 to 1.0 $\underline{M}$ is preferred and 0.5 $\underline{M}$ is most preferred. The diluent may be any inert, water-immiscible aromatic or aliphatic hydrocarbon such as diethylbenzene (DEB), diisopropylbenzene, xylene, dodecane or kerosene or a chlorinated carbon such as carbon tetrachloride, or a hydrogen bonding diluent such as a water-immiscible carboxylic acid.

The loaded extractant after contact with the feed solution may be contacted with an 0.5 to 1.5 $\underline{M}$, preferably 1 $\underline{M}$, nitric acid scrub solution to remove any Ru, Pd, Tc, Sr and Cs values which may be co-extracted with the actinide and other values.

The acid strip solution may be from 5 to 8 $\underline{M}$, preferably 6 $\underline{M}$, in nitric acid in order to recover the Am, Cm and rare earth values from the loaded extractant. The Am and Cm values may then be separated from the rare earth values by methods known to those skilled in the art, such as by cation exchange chromatography using diethylenetriamine pentaacetic acid.

The Np and Pu together with the fission product Zr, Nb and Mo and the Fe are readily stripped from the loaded extractant with the oxalate strip solution consisting of from 1.0 to 0.1 $\underline{M}$, preferably 0.35 $\underline{M}$, oxalic acid (H$_2$Ox) and from 1.0 to 0.1 $\underline{M}$, preferably 0.35 $\underline{M}$, tetramethylammonium hydrogen oxalate (TMA·HOx). The total H₂Ox and TMA·HOx present in the solution should total no more than about 1.0 M while the ratio of TMA HOx to H₂Ox may vary from 100 to 0.5, preferably 1. Alternatively, a strip solution of 0.2 to 1.0 $\underline{M}$, preferably 0.5 $\underline{M}$ trimethylammonium hydrogen oxalate without oxalic acid may be used. These solutions form oxalate complexes with the Np, Pu and certain f.p. values which are orders of magnitude greater than are the formation constants of oxalate complexes with the other actinides. Thus only an amount of trimethylammonium hydrogen oxalate or H₂Ox and TMA HOx sufficient to form oxalate complexes with these values should be used to form the oxalate strip.

The stripped extractant now contains only a small amount of uranium in addition to some yttrium and other waste and break-down products. The uranium and yttrium values are recovered by contact with about an 8.0 $\underline{M}$ phosphoric acid strip solution, from which the uranium and yttrium can be readily separated for reprocessing or combined with the other waste for solidification and storage. The H₃PO₄ can then be recovered and recycled. Since there are only small quantities of U values present in the extractant, this step need occur only after every several cycles of the extractant through the partitioning process. The extractant may be cleaned up for recycle by contact with about a 2.0 $\underline{M}$ nitric acid scrub solution.

The neptunium and plutonium values are recovered from the oxalate strip solution and purified of the coextracted fission products and iron values by adding an amount of a strong nitric acid solution, which may be up to 15 $\underline{M}$ in nitric acid sufficient to destroy the complexing ability of the oxalate, forming a second feed solution. The second feed so formed is then contacted with a second extractant which consists of 0.1 to 0.5 $\underline{M}$ tricapryl methyl ammonium nitrate (TCMA·NO₃) in an inert water-immiscible hydrocarbon diluent which selectively extracts the neptunium and plutonium values from the feed solution. The feed may then be combined with the first feed solution and other raffinate to be processed for storage.

The loaded second extractant is then contacted with a formic acid strip solution which may be 0.5 to 1.5, preferably 1.0 $\underline{M}$, in formic acid to recover the neptunium and plutonium values from the extractant. The extractant may then be scrubbed with about a 4 $\underline{M}$ nitric acid solution before being recycled.

The extraction temperature is not critical and may be carried out over a range of from about 25° to 75° C., with 50° C. being generally preferred for the stripping steps due to the self heating effect of the radioactive values present. A first extractant - first feed contact temperature of 25° C. is slightly preferred over higher temperatures in order to improve americium and curium distribution ratios. In general, contact times are not critical, although three minutes was found satisfactory to ensure phase mixing. The actual extraction operation can be carried out in batch or continuous operation, using, for example, simple mixing, mixer settlers, direct or countercurrent flow columns, centrifugal contactors as liquid-liquid extraction in a chromatographic column or using other similar conventional type equipment known to those skilled in the art. Phase ratios can be varied depending upon engineering considerations and economic factors.

In an alternative embodiment of the process, extraction of the actinides from the first feed solution is carried out in two phases rather than in a single phase. This may be done in order to reduce the volume of waste which must be disposed of, since it requires less volume of oxalate stripping solution. It does, however, increase the complexity of the process by requiring two extractant process streams.

In the alternative method, the feed solution, which is generally about 2.2 to 2.6 $\underline{M}$ in acid after the valence adjustment, is contacted with a first extractant of about 0.5 M HDHoEP in an organic diluent in a volume ratio of 0.25 to 0.50 volumes extractant to feed. This preferentially extracts the neptunium and plutonium values, the fission product zirconium, niobium and molybdenum values, the iron values, and some of the americium, curium and rare earth values, forming the first loaded extractant. This is because of the lower organic to aqueous volume ratios and the acid concentration. The preferentially extracted values such as the neptunium, plutonium and fission products are taken up first by the extractant, while only a small fraction of the americium and curium values, thereby loading the extractant.

The feed solution containing the remaining values is diluted to adjust the HNO₃ concentration to 0.5 to 1.5 $\underline{M}$ and contacting the adjusted feed with a second extractant of the same composition in a volume ratio of about 1:1 whereby the remaining americium and curium values and the remaining rare earths are extracted. The feed solution can then be subjected to additional extractions to remove other values present or further processed to prepare it for storage.

The first extractant is then contacted with the oxalate strip to selectively strip the neptunium, plutonium, zirconium, niobium, molybdenum and iron values from the extractant, forming a first stripped extractant. The loaded scrub is then processed as described to recover and purify the neptunium and plutonium values.

The first stripped extractant is then mixed with the second extractant to form a combined extractant which is contacted with about 8 $\underline{M}$ HNO₃ scrub solution to strip the americium, curium and rare earth values remaining in the extractant. The extractant may then be scrubbed and recycled or contacted with the phosphoric acid solution to strip any uranium and yttrium values, before recycling.

EXAMPLE I

A synthetic waste solution was prepared by mixing nitric acid solutions of salts of nonradioactive isotopes of 30 fission products and rare earths. The quantities of fission product elements used were for a light water reactor fuel irradiated to 33,000 MWd/metric ton of heavy metal. The products from 1 metric ton of the fuel are assumed to be present in 5600 liters of 2.9 $\underline{M}$ HNO₃ (HAW waste stream) or 5900 liters of 2.4 $\underline{M}$ HNO₃ (EEW waste stream formed from exhaustive tributyl phosphate extraction of the HAW waste stream). In addition to the fission products 0.19 g/liter of iron as ferric nitrate was introduced into the synthetic waste to simulate corrosion products. Separate portions of synthetic waste were spiked with about 10⁸ d/m of either $^{239}$Np, $^{239}$Pu or $^{241}$Am for testing.

A countercurrent extraction process was set up using 0.5 $\underline{M}$ HDHoEP in DEB, synthetic EEW waste solution which was 2.4 $\underline{M}$ in nitric acid and which was made 0.03 $\underline{M}$ in HAN and N₂H₄, and a scrub of 1.0 $\underline{M}$ HNO₃. The phase ratio of feed: organic:scrub was 1.0:1.33:.33. After four extraction stages and two scrub stages at 25° C., the extractant contained 99.9% of the neptunium, 99.9% of the plutonium and 96.3% of the americium.

Calculations showed that after ten extraction and four scrub stages 99.8% of the americium and curium would be extracted in addition to 99.9% of the uranium present in the feed.

EXAMPLE II

A portion of the extractant from Example I containing fission products, rare earths and actinides was contacted with 6 $\underline{M}$ HNO$_3$ strip solution at 50° C. with an organic to aqueous ratio of 2:1. After three stages, less than 0.1% of the neptunium and plutonium and 93% of the americium and curium had been stripped from the extractant. It was calculated that after eight stages less than 0.1% of the neptunium and plutonium would be stripped and 99.8% of the americium and curium would be stripped.

EXAMPLE III

A portion of the stripped extractant from Example II was contacted with an oxalic strip solution which was 0.35 $\underline{M}$ in H$_2$Ox and 0.35 $\underline{M}$ in TMA·HOx at an organic to strip ratio of 2:1. After four stages 97% of the of the neptunium, 99.7% of the plutonium and 5% of the rare earths had been stripped from the organic extractant. It was calculated that after eight stages 99.3% of the neptunium and 99.99% of the plutonium would be stripped from the extractant into the oxalate solution.

EXAMPLE IV

To the oxalate strip solution from Example III was added sufficient 15 $\underline{M}$ HNO to make the solution 5 $\underline{M}$ in HNO$_3$, reducing the oxalate concentration to about 0.47 $\underline{M}$, forming a second feed solution. The second organic extractant was 0.25 $\underline{M}$ TCMA NO$_3$ in DEB and the scrub was 5 $\underline{M}$ HNO$_3$. The feed to organic to scrub ratio was 0.6:0.4:0.2. After four extraction and 4 scrub steps, 99.9% of the neptunium and the plutonium were extracted from the second feed solution.

EXAMPLE V

The organic extractant from the previous example was contacted with a 1 $\underline{M}$ formic acid strip solution containing 0.1 $\underline{M}$ nitric acid in an organic to strip phase ratio of 2:1. After five stages 99+% of the neptunium and the plutonium had been stripped from the extractant.

EXAMPLE VI

To 5900 liters of EEW waste solution described in Example I is added 180 moles of HAN and 180 moles of N$_2$H$_4$ in 100 liters of 0.1 $\underline{M}$ HNO$_3$ to make 6000 liters of a feed solution containing 190 g uranium, 5 g neptunium, 4.5 g plutonium, 141 g americium, 37 g curium, 10.23 kg rare earths and 18.6 kg fission products.

The feed solution is then contacted in about 10 stages with an extractant totaling 8000 liters of 0.5 $\underline{M}$ HDHoEP in DEB which is in turn scrubbed with several portions totaling 2000 liters of 1.0 $\underline{M}$ HNO$_3$ to remove any ruthenium, palladium, technetium, strontium and cesium values which may coextract. The extractant now contains about 5 g neptunium, 4.5 g plutonium, 190 g uranium, 141 g americium and 37 g curium in addition to about 7.0 kg fission products such as zirconium, niobium and molybdenum, some iron and about 10 kg of rear earths. The raffinate is sent for evaporation and waste solidification for storage.

The loaded extractant is then contacted in 8 stages with a total of about 4000 liters of a 8.0 $\underline{M}$ HNO$_3$ strip solution whereby the americium, curium and rare earth values are stripped from the extractant to form an acid product solution containing 141 g americium, 37 g curium and 10 kg rare earths.

The extractant is next contacted in 8 stages with a total of 4000 liters of an oxalate strip solution 0.35 $\underline{M}$ in H$_2$Ox and 0.35 $\underline{M}$ in TMA·HOx whereby the oxalate solution now contains 5 g neptunium, 4.5 g plutonium, and about 7.5 kg of fission product zirconium, niobium and molybdenum. To the 4000 liters of oxalate strip solution containing the plutonium and other values is added about 2000 liters of 15 $\underline{M}$ HNO$_3$ to destroy the oxalate and form a feed solution about 5 $\underline{M}$ in HNO$_3$. This feed solution is then contacted in 4 stages with 4000 liters of extractant of 0.25 $\underline{M}$ TCMA·NO in DEB. The extractant is in turn scrubbed in 4 stages with 2000 liters of 5 $\underline{M}$ HNO$_3$ which when added to the oxalate raffinate makes up 8000 liters of waste solution containing about 0.005 g neptunium, 0.005 g plutonium, and about 7.0 kg fission products to be further processed for storage.

About 2000 liters of a 1 $\underline{M}$ formic acid strip solution is next contacted in 5 stages with the loaded extractant to strip the neptunium and plutonium values from the extractant while the extractant is scrubbed once more with 2000 liters of 5 $\underline{M}$ HNO$_3$ to prepare it for recycling.

It can be seen that the process of this invention provides a method whereby the actinide values can be effectively portioned or recovered from a fuel reprocessing waste solution.

It is obvious that some changes may be made in the content of the aqueous and organic solutions and that additional steps may be added to the invention, such as, for example, extraction or stripping steps, without departing from the invention. Therefore, it will be understood that the invention is not to be limited to the details given herein but that it may be modified within the scope of the appended claims.

The embodiments of the invention in which an exclusive property or privilege is claimed are defined as follows:

1. A process for separating and recovering actinide values from acidic nuclear fuel reprocessing waste solutions containing actinide values, lanthanide values, fission product values and other metal values comprising:
   a. adding hydrazine and hydroxylammonium nitrate in equimolar amounts to the waste solution to adjust the oxidation state of neptunium and plutonium in the waste solution to +4, thereby forming a feed solution;
   b. contacting the feed solution with an organic extractant of 0.1 to 1.5 $\underline{M}$ di-hexoxyethyl phosphoric acid in a water-immiscible aromatic or aliphatic hydrocarbon diluent whereby the actinide values, the rare earths, some fission product values and iron are selectively extracted from the feed solution thereby loading the extractant;
   c. contacting the loaded extractant with a first aqueous strip selected from the group consisting of a nitric acid solution and an oxalate solution, the oxalate solution selected from the group consisting of oxalic acid and tetramethylammonium hydrogen oxalate, and trimethylammonium hydrogen oxalate, the nitric acid solution selectively stripping americium, curium and rare earth values and the oxalate solution selectively stripping neptunium, plutonium, fission product zirconium, niobium and molybdenum and iron values, the uranium values remaining in the extractant, whereby some of the actinide values and some of the other values are stripped from the extractant, forming a partially loaded extractant; and d. contacting the partially loaded extractant with the other of the strip solutions of step (c), whereby the remaining actinide values and some of the other values are stripped from the extractant, thereby recovering the actinide values from the waste solution.

2. The process of claim 1 wherein the strong nitric acid strip is from 5 to 7 $\underline{M}$ in nitric acid.

3. The process of claim 1 wherein the oxalate strip solution is from 1.0 to 0.1 $\underline{M}$ in oxalic acid and from 1.0 to 0.1 $\underline{M}$ in tetramethylammonium hydrogen oxalate or from 0.2 to 1.0 $\underline{M}$ in trimethylammonium hydrogen oxalate.

4. The process of claim 1 wherein the volume ratio of feed to extractant is about 1:1.

5. The process of claim 1 including the additional steps:

e. adding nitric acid to the oxalate strip solution containing the neptunium, plutonium and fission product zirconium, niobium, and molybdenum values in an amount sufficient to destroy the complexing ability of the oxalate, thereby forming a second feed solution;

f. contacting the second feed solution with a second organic extractant of about 0.1 to 0.5 $\underline{M}$ tricaprylmethyl ammonium nitrate in an inert water-immiscible aromatic or aliphatic hydrocarbon diluent whereby the neptunium and plutonium values are selectively extracted from the feed solution and;

g. contacting the extractant with a formic acid strip solution about 0.5 to 1.5 $\underline{M}$ in formic acid, whereby the neptunium and plutonium values are stripped from the extractant, thereby recovering the neptunium and plutonium values.

6. The process of claim 1 wherein the feed solution from step a is about 2.2 to 2.6 $\underline{M}$ in acid and is subjected to a processing treatment comprising, contacting the feed solution with a first organic extractant of 0.1 to 1.5 $\underline{M}$ di-hexoxyethyl phosphoric acid in a water-immiscible aromatic or aliphatic hydrocarbon in a volume ratio of 0.25 to 0.50 volumes extractant to feed, whereby the neptunium and plutonium values are preferentially extracted along with fission product zirconium, niobium and molybdenum, and iron values, thereby forming a first loaded extractant, adjusting the acid concentration of the feed solution to from about 0.5 to 1.5 $\underline{M}$, contacting the adjusted feed solution with a second extractant of 0.1 to 1.5 $\underline{M}$ di-hexoxyethyl phosphoric acid in a water-immiscible aromatic or aliphatic hydrocarbon in a volume ratio of feed to extractant of about 1 to 1 whereby the remaining actinide values and rare earth values are extracted thereby forming a second loaded extractant, contacting the first loaded extractant with the oxalate strip solution whereby the plutonium, neptunium fission product zirconium, niobium and molybdenum and iron values are stripped from the extractant, thereby forming a first stripped extractant, combining the first stripped extractant with the second loaded extractant thereby forming a combined extractant, and contacting the combined extractant with a strong nitric acid strip solution whereby the curium, americium and rare earth values are stripped from the complexed extractant, thereby recovering the americium and curium values.

7. The process of claim 6 including the additional steps:

adding nitric acid to the oxalate strip solution containing the reptunium, plutonium and fission product zirconium, niobium, and molybdenum values in an amount sufficient to destroy the complexing ability of the oxalate, thereby forming a second feed solution;

contacting the second feed solution with a second organic extractant of about 0.1 to 0.5 $\underline{M}$ tricaprylmethyl ammonium nitrate in an inert water-immiscible aromatic or aliphatic hydrocarbon diluent whereby the neptunium and plutonium values are selectively extracted from the feed solution; and contacting the extractant with a formic acid strip solution about 0.5 to 1.5 $\underline{M}$ in formic acid, whereby the neptunium and plutonium values are stripped from the extractant, thereby recovering the neptunium and plutonium values.

* * * * *